(12) United States Patent
Zentler (10) Patent No.: US 10,853,884 B2
(45) Date of Patent: *Dec. 1, 2020

(54) SYSTEM AND METHOD OF REAL TIME DETECTION OF AERIAL VEHICLE FLIGHT PATTERNS AND INSURANCE POLICY UPDATES

(71) Applicant: Blackbird Holdings, LLC, Seattle, WA (US)

(72) Inventor: Erik T. Zentler, Seattle, WA (US)

(73) Assignee: BLACKBIRD HOLDINGS, LLC, Seattle, WA (US)

(*) Notice: Subject to any disclaimer, the term of this patent is extended or adjusted under 35 U.S.C. 154(b) by 270 days.

This patent is subject to a terminal disclaimer.

(21) Appl. No.: 15/862,362

(22) Filed: Jan. 4, 2018

(65) Prior Publication Data

US 2018/0144408 A1 May 24, 2018

Related U.S. Application Data

(63) Continuation of application No. 15/227,699, filed on Aug. 3, 2016, now Pat. No. 9,892,464.

(60) Provisional application No. 62/239,130, filed on Oct. 8, 2015.

(51) Int. Cl.
G06Q 40/08 (2012.01)

(52) U.S. Cl.
CPC .................................... *G06Q 40/08* (2013.01)

(58) Field of Classification Search
CPC ...................................................... G06Q 40/08
See application file for complete search history.

(56) References Cited

U.S. PATENT DOCUMENTS

| 5,270,708 A | 12/1993 | Kamishima |
| 7,389,246 B1 | 6/2008 | Ohrt |
| 8,103,526 B1 | 1/2012 | Pallesen et al. |
| 8,595,037 B1 | 11/2013 | Hyde et al. |
| 8,605,141 B2 | 12/2013 | Dialameh et al. |
| 8,634,980 B1* | 1/2014 | Urmson ............... G05D 1/0214 701/23 |
| 9,014,661 B2 | 4/2015 | deCharms |
| 9,141,995 B1* | 9/2015 | Brinkmann ............ G06Q 40/08 |
| 2006/0213359 A1 | 9/2006 | Vitale et al. |
| 2008/0319602 A1* | 12/2008 | McClellan ............. G07C 5/008 701/31.4 |

(Continued)

OTHER PUBLICATIONS

Amato, "Do You Need Drone Insurance?," dronelife, 2015, 2 pages.
SkyWatch.AI—About, https://skywatch.ai/us/about—5 pages, retrieved Feb. 24, 2020.

*Primary Examiner* — Eric T Wong
(74) *Attorney, Agent, or Firm* — Seed IP Law Group LLP (57) ABSTRACT

A system and method for providing real-time insurance coverage and updating the insurance coverage for an aerial vehicle based on current flight characteristics and an operator profile. A current flight pattern is generated from the current flight characteristics and is compared to a flight pattern of another aerial vehicle that was involved in an incident to generate a current risk profile of the aerial vehicle. The risk profile is adjusted based on an operator profile for the current operator of the aerial vehicle. As the operator operates the aerial vehicle, an insurance policy is automatically adjusted in real time as the risk profile changes in response to changes in the flight characteristics of the aerial vehicle.

20 Claims, 4 Drawing Sheets

(56) References Cited

U.S. PATENT DOCUMENTS

| | | | |
|---|---|---|---|
| 2009/0040054 A1* | 2/2009 | Wang | B60W 30/095 340/576 |
| 2010/0131303 A1 | 5/2010 | Collopy et al. | |
| 2012/0109418 A1* | 5/2012 | Lorber | G06Q 10/00 701/1 |
| 2012/0316913 A1 | 12/2012 | Reyes | |
| 2014/0052479 A1 | 2/2014 | Kawamura | |
| 2014/0278586 A1* | 9/2014 | Sanchez | G06Q 40/00 705/4 |
| 2015/0154709 A1 | 6/2015 | Cook | |
| 2015/0323930 A1 | 11/2015 | Downey et al. | |
| 2015/0324501 A1* | 11/2015 | Desell | G01C 23/00 703/2 |
| 2015/0325064 A1* | 11/2015 | Downey | G08G 5/0026 701/29.3 |
| 2016/0093124 A1* | 3/2016 | Shi | B64D 47/08 701/2 |
| 2016/0292932 A1 | 10/2016 | Gremmert et al. | |

* cited by examiner

SYSTEM AND METHOD OF REAL TIME DETECTION OF AERIAL VEHICLE FLIGHT PATTERNS AND INSURANCE POLICY UPDATES

BACKGROUND

Technical Field

The present disclosure pertains to risk management for airborne vehicles and, more particularly, to providing real-time insurance adjustments for airborne vehicles based on current flight patterns and operator profile.

Description of the Related Art

Recent advancements in drone and unmanned aerial vehicle technology have greatly reduced the cost of these vehicles and made them readily available to the general public. Although these vehicles are more affordable than in previous years, replacement and repair costs are still relatively high for most users. Similarly, the cost of personal injuries and property damage caused by reckless or uncontrolled aerial vehicle operations may increase as more aerial vehicles are flown in suburban locations. It is with respect to these and other considerations that implementations of the present disclosure are provided.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed implementations. However, one skilled in the relevant art will recognize that the present disclosed implementations may be practiced without one or more of these specific details or with other methods, components, materials, etc. In other instances, well-known structures or components or both that are associated with the environment of the present disclosure have not been shown or described in order to avoid unnecessarily obscuring descriptions of the implementations.

Throughout the specification, claims, and drawings, the following terms take the meaning explicitly associated herein, unless the context clearly dictates otherwise. The term "herein" refers to the specification, claims, and drawings associated with the current application.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

The phrases "in one implementation," "in another implementation," "in various implementations," "in some implementations," "in other implementations," and other variations thereof refer to one or more features, structures, functions, limitations, or characteristics of the present disclosure, and are not limited to the same or different implementations unless the context clearly dictates otherwise.

As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the disclosure, the meaning of "a," "an," and "the" include singular and plural references.

The following are various definitions of terms utilized herein to provide a general description of the terms, but are not intended to be an exclusive or exhaustive description.

As used herein, the terms "aerial vehicle" and "vehicle" may be used interchangeably and refer to a powered airborne object controlled by an operator or controlled autonomously. Examples of aerial vehicles include, but are not limited to, unmanned aerial vehicles, drones, manned aerial vehicles, fixed-wing aircraft, rotor-wing aircraft, vertical takeoff and landing systems, or the like, or some combination thereof. Aerial vehicles are also referred to as airborne vehicles.

As used herein, the term "remote control" refers to a device that is used to manually operate an aerial vehicle from a location remote to the aerial vehicle.

As used herein, the terms "Applicant," "Insured," and "Operator" may be used interchangeably and refer to a human, group of people, company, organization, or legal entity that applies for insurance, who has insurable interest in the aerial vehicle to be insured, and who provides the operational parameters, either manually or remotely, that result in the control of the operation of an aerial vehicle.

As used herein, the term "monitoring system" refers to a system that collects information regarding the operation of an aerial vehicle, including aerial-vehicle operational data and remote-control operational data. The monitoring system includes a vehicle monitoring system and a remote monitoring system. The vehicle monitoring system and a remote monitoring system include a plurality of different sensors to collect the operational data associated with the aerial vehicle and the operator. If installation of sensors is required by the operator, the operator initiates or performs a "system check" function prior to the monitoring system being operationally activated to make sure the monitoring system is properly calibrated prior to operation of the aerial vehicle. In some instances, the aerial vehicle may be non-operational until the monitoring system is installed, calibrated, and dynamic insurance is enabled.

The vehicle monitoring system includes onboard sensors, remote sensors, or a combination thereof to collect current flight characteristics and aerial-vehicle operational data of the aerial vehicle. The vehicle monitoring system may be on the aerial vehicle or data about the aerial vehicle may be collected remotely. The vehicle monitoring system may include, but is not limited to, an inertial measurement unit (IMU), gyroscope, magnetometer, accelerometer, altimeter or altitude meter, airspeed sensor or speedometer, engine or motor Revolutions Per Minute (RPM) monitor, course heading, Vertical Speed Indicator (VSI), Global Positioning System (GPS) (location of the vehicle, the operator, and the relation of one to the other), G-force sensor, acceleration and deceleration sensors, and other sensors to measure the roll, yaw, and pitch or their rates of change. The vehicle monitoring system is used to record whether the vehicle is in an on state or an off state, the duration of operation, location relative to fixed or known geographic markers, if it is moving, how it is moving, patterns of flight, pitch, roll, yaw, vertical and horizontal acceleration, speed, and altitude, as well as abrupt movements caused by contact with an object that is fixed or moving.

The remote monitoring system includes various sensors to collect characteristics and remote-control operational data of the operator as they operate the aerial vehicle. These characteristics provide information as to the operator's control of the aerial vehicle and how the operator responds to various conditions of the aerial vehicle. For example, does the operator react quickly or sporadically to control the vehicle in response to the vehicle's location, movement, or operation, or does the operator provide a more fluid and calculated control of the vehicle regardless of its location, movement, or operation. In some implementations, this remote monitoring system may be integrated into or separate from the actual remote control used by the operator to control the aerial vehicle. In at least one implementation, the remote monitoring system may also include one or more biological sensors (e.g., fingerprint, retina, or cardio-rhythmic sensors) that can be used to identify the operator of the aerial vehicle. In this way, the system knows if the current operator hands the remote control to a different operator, which can be used to further adjust the insurance coverage during operation of the aerial vehicle.

As used herein, the term "operational data" refers to data, both real-time and historical, that is collected by a monitoring system of an aerial vehicle to identify behavioral data or flight characteristics of the operator and aerial vehicle as the operator operates the aerial vehicle. Operational data includes aerial-vehicle operational data collected from the aerial-vehicle monitoring system and remote-control operational data collected from the remote-control monitoring system.

Aerial-vehicle operational data includes various flight characteristics associated with the movement or operation of the aerial vehicle, such as, but not limited to, altitude, airspeed, vertical and horizontal velocity and acceleration, engine or motor revolutions per minute (RPM), course heading, location of the aerial vehicle, G-force information, on/off state information, duration of operation, vehicle orientation, and rate of roll, yaw, and pitch. This aerial-vehicle operational data is utilized to determine a current flight pattern of the aerial vehicle.

Remote-control operational data includes various flight characteristics associated with how the operator controls the aerial vehicle and responds to the movement of the aerial vehicle, such as, but not limited to, type, rate, and reaction time of operator response to aerial vehicle movement, location, or operation. This remote-control operational data is utilized, along with the aerial vehicle operational data, to determine an operator profile for the operator.

Operational data also includes weather and other environmental characteristics, both real-time and historical, associated with the operation of an aerial vehicle. For example, the operational data of historical flights that resulted in an incident includes the weather at time of the incident and at the location of the incident, e.g., the temperature, cloud covering, precipitation, time of day, or other environmental characteristics at the time and location of the incident or the seconds or minutes leading up to the incident. Similarly, the operational data of a current flight includes the current weather at the location of the aerial vehicle, e.g., current temperature, current precipitation, current cloud cover, current time of day, or other environment characteristics in real time as the aerial vehicle is being operated.

As used herein, the terms "behavioral data" and "flight characteristics" may be used interchangeably and refer to the nature of how an operator and aerial vehicle interact with or without a remote control. Behavioral data is comprised of a plurality of different operational data, where each separate operation datum is a separate flight characteristic. For example, airspeed and altitude are aerial-vehicle operational data, where airspeed is one flight characteristics and altitude is a separate flight characteristic. The behavioral data is utilized to create an operational history of the aerial vehicle and to generate an operator profile for the current operator of the aerial vehicle.

As used herein, the term "operational history" refers to the current or previous operation of one or more aerial vehicles based on behavioral data generated and collected in real time and over time. Operational history may be generated for an individual operator or for an individual aerial vehicle, such as a target aerial vehicle for which a particular operator is purchasing insurance. Operational history may also be generated from the aggregation of behavioral data from a plurality of operators or a plurality of aerial vehicles. The operational history includes current flight patterns of the aerial vehicle, as well as historical flight patterns (e.g., flight patterns that resulted in incidents) or other information associated with one or more aerial vehicles.

The operational history is used to generate and change a risk profile of an operator and to adjust insurance rates or coverage of relative operations of an aerial vehicle. Operational history can provide insight into certain fight patterns or operations that result in higher incident occurrences, such that when those patterns are flown in the future by an operator, higher rates can be applied to that operator. For example, specific previous flight patterns and factors will reveal higher levels of incident occurrence that will result in increased rates while a current flight pattern matching the previous flight patterns is being flown.

As used herein, the term "incident" refers to an event or accident that resulted in damage to a person or property, ticket, citation, confiscation of the aerial vehicle, or other action cause by unsafe or unlawful use of the aerial vehicle.

As used herein, the term "flight pattern" refers to a plurality of flight characteristics at a given point in time or collected over a time period of operation. One non-exhaustive example flight pattern may be the current airspeed and current altitude of an aerial vehicle. Another non-exhaustive example flight pattern may be the airspeed and altitude at time T1, the rate or roll at time T2, and the RPMs at time T3. A current flight pattern of an aerial vehicle is a flight pattern that is occurring in real time during operation of the aerial vehicle. A previous flight pattern of an aerial vehicle is a flight pattern that occurred during prior operation of the aerial vehicle. Previous flight patterns that resulted in incidences along with other data are used to define unsafe flying, and previous flight patterns that resulted in no incidences are used to define safe flying.

As used herein, the term "operator profile" refers to information associated with how a current operator of an aerial vehicle is operating that particular aerial vehicle. The operator profile is generated from the behavioral data associated with the operator and aerial vehicle. The operator profile is modified in real time as the operator operates the aerial vehicle.

As used herein, the term "risk profile" refers to information associated with how an aerial vehicle is operating relative to historical information of one or more other aerial vehicles. The risk profile identifies a level of potential incident or insurance claim—based on how the aerial vehicle is operating and who is operating the aerial vehicle—which the insurance company may have to pay on behalf of the insured if an incident were to occur. The risk profile is dynamically generated or adjusted based on an analysis of the operational history and the operator profile. Other information (e.g., risk information, aerial vehicle information, and operator information) is also used to generate and adjust the risk profile.

The risk profile is used to determine the rates and coverage for an aerial vehicle and operator as the operator is operating the aerial vehicle. A higher risk profile is an indication of a greater chance of a claim, which results in higher rates and lower available coverage. A lower the risk profile is an indication of a lower chance of a claim, which results in lower relative rates and higher available coverage. The risk profile can change over time as the aerial vehicle is being operated. So, if the operator begins to fly the aerial vehicle in an identified and predetermined safe manner, then the risk profile may decrease. But if the operator begins to fly the aerial vehicle in an identified and predetermined unsafe manner, then the risk profile may increase.

Some experienced operators will be able to operate smaller aerial vehicles in congested areas during poor weather conditions and operate with a consistent pitch, roll, yaw, attitude, speed, and altitude while keeping distance from fixed objects—demonstrating a lower risk profile, resulting in favorable insurance rates from the insurance company. Alternatively, a low experience operator will have difficulty maintaining a consistent altitude, frequent change in pitch/roll and acceleration while operating a large vehicle in low density open areas with clear line of sight—demonstrating a higher risk profile, resulting in less favorable insurance rates from the insurance company.

The amount at which the risk profile changes is based on the experience level of the operator, how the operator is operating the aerial vehicle, and the current flight characteristics of the aerial vehicle. So, a more experienced operator operating the aerial vehicle in a particular manner may result in a smaller increase or larger decrease in the risk profile compared to a less experience operator operating the aerial vehicle in the same particular manner. Over time, as interactions of the operator and aerial vehicle are recorded, the operator will likely demonstrate improved proficiency in the operation of the aerial vehicle resulting in a lowered risk profile from the insurance company.

As used herein, the term "insurance" refers to a product used to transfer a portion or all of the risk of property damage or liability from one party to another, such as an insurance company, resulting in the payment of a premium in exchange for the insurance.

As used herein, the term "rates" refers to pricing that reflects a premium the insurance company is willing to receive in exchange for the transfer for the desired level of risk, either property or liability, to the insurance company.

As used herein, the terms "billing" or "invoicing" refer to an initial premium agreed upon at the inception of the policy, and an additional or return premium due to changes in rates or coverage as the risk profile is modified as an operator operates the aerial vehicle over the policy period.

As used herein, the term "policy issuance" refers to applicant and vehicle information that is provided and transferred to the fillable fields of the insurance policy and delivered to the Insured and provides an acknowledgement of receipt.

As used herein, the term "user interface" refers to a system accessed through a computer or mobile device that is used to gather and deliver information to or from the operator, including but not limited to the initial application for insurance, a coverage request (binding), the issued insurance policy, billing information, invoicing, vehicle operational data (real-time and historical), operator profile, aerial vehicle registration information, and additional coverage or certificates of insurance. In some implementations the user interface may be through a web browser accessible via an operator's smartphone, desktop computer, laptop, tablet, or other operator computing device.

As used herein, the terms "risk generator" and "risk generator computing device" refer to a computer, server, or other computing system that dynamically and automatically adjusts an insurance policy for an aerial vehicle operator in real-time as the operator is operating the aerial vehicle. The risk generator computing device receives applicant/operator information, aerial-vehicle information, aerial-vehicle operational data, remote-control operational data, operational historical data of other aerial vehicles, risk information, or other operator, aerial vehicle, or insurance information. The risk generator aggregates and analyzes the received data to determine and adjust a risk profile for the operator and aerial vehicle. The risk profile is used to generate and dynamically modify an insurance policy for the operator. The risk generator also generates the appropriate billing documentation based on the ever-changing insurance policy. The risk generator, which is further described in conjunction with FIG. 4, includes, among other physical computing components, a memory that stores instructions and a processor that executes the instructions to perform various actions described herein.

As used herein, the term "satellite" refers to a system used to transmit data and provide GPS location information.

Described herein are systems and methods to provide a real-time insurance solution for aerial vehicles operated remotely or manually using historical operations data, real-time operational data, or a combination thereof. The operational data is based on the behavior of the operator or the vehicle, or both, which are collected using monitoring systems, sensors, and software.

Figure 1:
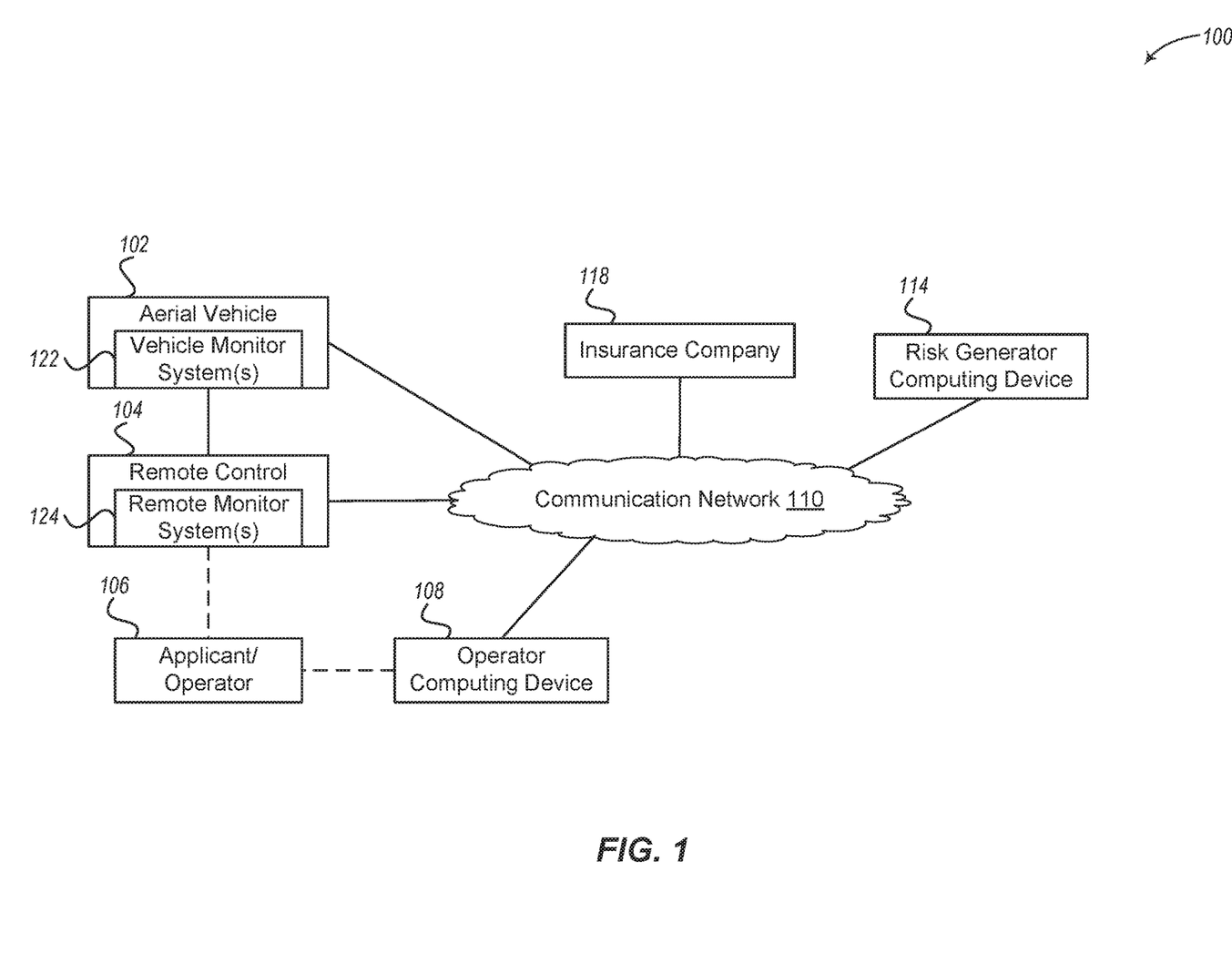
FIG. 1 is a context diagram that illustrates an example implementation of an environment that provides real-time insurance policy updates as described herein.

FIG. 1 is a context diagram that illustrates an example implementation of an environment 100 that provides real-time insurance policy updates. The environment 100 includes an aerial vehicle 102 and a risk generator computing device 114, among other components described herein.

The operation and movement of the aerial vehicle 102 is controlled by an operator 106 via a remote control 104. Although in some implementations, the aerial vehicle 102 may be operated autonomously without the remote control 104. As described herein, the aerial vehicle 102 includes an aerial-vehicle monitoring system 122 that monitors the movement and flight characteristics of the aerial vehicle 102 to obtain aerial-vehicle operational data. Although FIG. 1 shows the vehicle monitoring system 122 as being part of the aerial vehicle 102, implementations are not so limited and the vehicle monitoring system 122 may be integrated into the aerial vehicle 102, separate from but attached to the aerial vehicle 102, or remotely located from the aerial vehicle 102.

The aerial-vehicle operational data collected from the vehicle monitoring system 122 is provided to the risk generator computing device 114 via a communication network 110. Some aerial vehicles 102 may not have the electrical power or electrical components to communicate with the communication network 110. In at least one such implementation, the aerial vehicle 102 may provide the collected aerial-vehicle operational data to the remote control 104 or some other computing device (not illustrated), which forwards the data to the risk generator computing device 114 via the communication network 110.

In some implementations, the remote control 104 includes a remote-control monitoring system 124 to obtain remote-control operational data by monitoring responses and actions performed by the operator 106 while operating the aerial vehicle 102. Although FIG. 1 shows the remote monitoring system 124 as being part of the remote control 104, implementations are not so limited and the remote monitoring system 124 may be integrated into the remote control 104, separate from but attached to the remote control 104, or remotely located from the remote control 104.

The remote control 104 may provide the collected operational data to the risk generator computing device 114 via the communication network 110. Alternatively, the remote control 104 may provide the collected remote-control operational data to the aerial vehicle 102 or some other computing device (not illustrated), which forwards the data to the risk generator computing device 114 via the communication network 110.

The collected operational data is provided to the risk generator computing device 114 in real time or near real time as the data is collected during the operation of the aerial vehicle 102. In this way, the risk generator computing device 114 can constantly change, modify, or otherwise update the insurance rates or coverage for the operator 106 and the aerial vehicle 102 in real time as the operator 106 operates the aerial vehicle 102.

The communication network 110 includes one or more wired or wireless communication mechanisms, such as, the Internet, Bluetooth®, Wi-Fi, satellite link, or other known communication methods that can transmit data from the aerial vehicle 102 or the remote control 104 to a remote computing device (e.g., the risk generator computing device 114).

As described herein, the risk generator computing device 114 aggregates and analyses the operational data received from the aerial vehicle 102 or the remote control 104 to dynamically generate and adjust insurance rates and coverage for the operator 106 and the aerial vehicle 102. In some implementations, the risk generator computing device 114 receives insurance information from an insurance company 118. This information may include, different available rates or coverages, information about the operator 106 (e.g., personal information, history of previous incidents, experience level, training certifications, or other operator information related to how that operator may operate the aerial vehicle 102), information about the aerial vehicle 102 (e.g., history of previous incidents for that particular aerial vehicle, as well as other aerial vehicles of the same make and model, previous flight patterns associated with incidents, or other historical operational data related to the operation of the aerial vehicle 102), or other risk-related information associated with the aerial vehicle 102 or the operator 106.

The risk generator computing device 114 may provide the resulting rates and coverage to the insurance company 118 or it may provide it to the operator 106 via an operator computing device 108. The operator computing device 108 may be a mobile phone, tablet computer, smartphone, desktop computer, laptop computer, or other commuting device.

The operator 106 may utilize a user interface of the operator computing device 108 to access an application, website, or other informational portal of the risk generator computing device 114 or the insurance company 118 to receive or obtain access to the rates, coverages, or other insurance information associated with the insurance provided by the insurance company 118 as determined and dynamically adjusted by the risk generator computing device 114. The operator 106 may also utilize the user interface of the operator computing device 108 to select, change, or access coverage, policy issuance, billing, or invoicing information.

Figure 2:
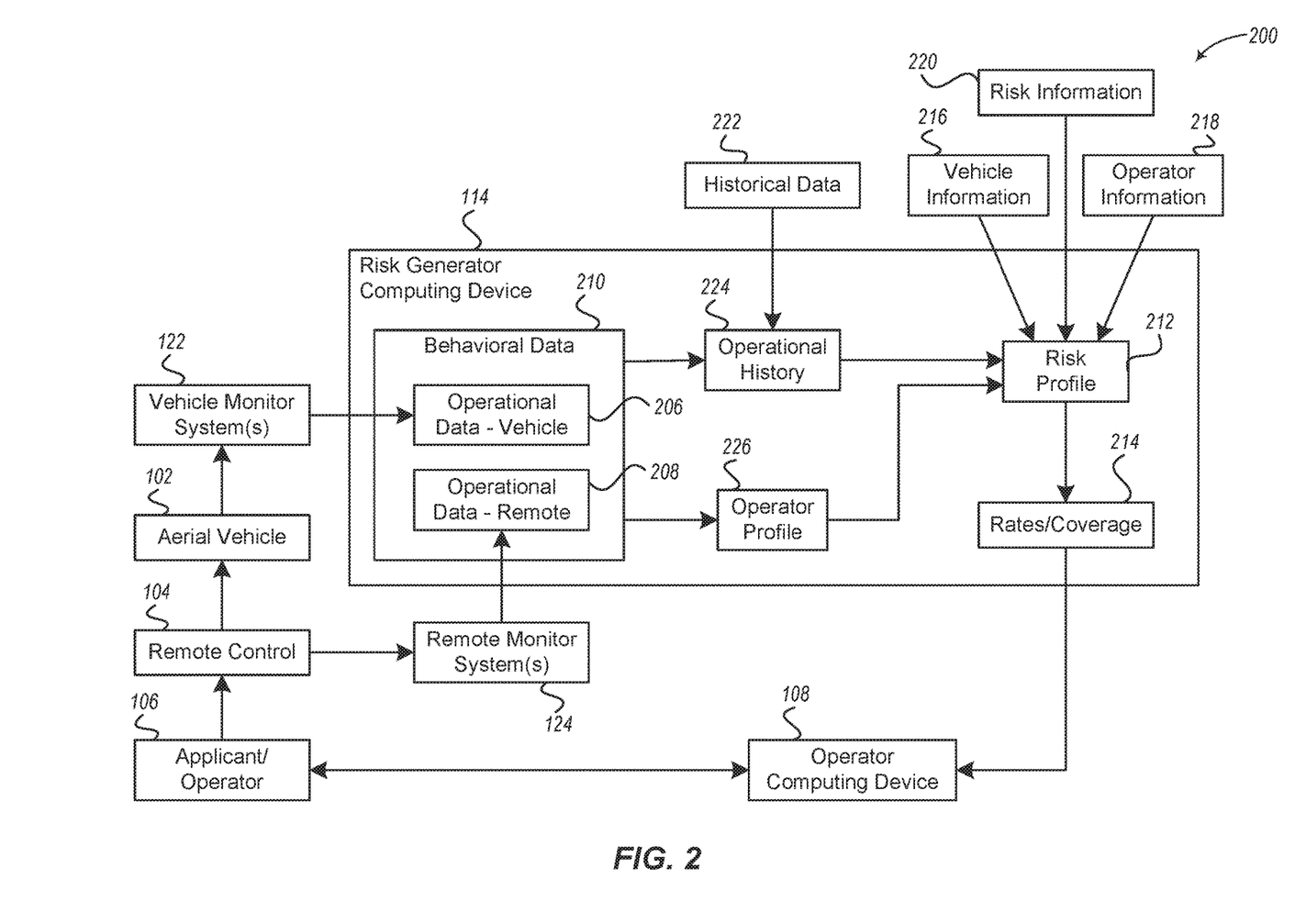
FIG. 2 is a block diagram that illustrates one implementation of a system for providing real-time insurance policy updates as described herein.

FIG. 2 is a block diagram that illustrates one implementation of a system 200 for providing real-time insurance policy updates. The system 200 includes an aerial vehicle 102 and a risk generator computing device 114. As described above in conjunction with FIG. 1, the operation and movement of the aerial vehicle 102 is controlled by an operator 106 via a remote control 104.

The system 200 also includes an aerial-vehicle monitoring system 122 and a remote-control monitoring system 124. The aerial-vehicle monitoring system 122 includes a plurality of sensors to monitor the operating and flight characteristics of the aerial vehicle 102. The vehicle monitoring system 122 provides the monitored and collected information to the risk generator computing device 114 as aerial vehicle operational data 206. The remote-control monitoring system 124 includes a plurality of sensors to monitor the remote control 104 inputs and reactions of the operator 106 as the operator 106 is operating the aerial vehicle 102. The remote monitoring system 124 provides the monitored and collected information to the risk generator computing device 114 as remote-control operational data 208.

The risk generator computing device 114 aggregates the aerial-vehicle operational data 206 and the remote-control operational data 208 into behavioral data 210. The behavioral data 210 is utilized to generate an operational history 224 of the aerial vehicle 102. The operational history 224 includes a consistently updating current flight pattern of the aerial vehicle 102, as well has previous flight patterns of the aerial vehicle 102 or other aerial vehicles (not illustrated). The risk generator computing device 114 generates the current flight pattern of the aerial vehicle 102 based on a combination of a plurality of behavioral data 210. Similarly, the risk generator computing device 114 generates one or more previous flight patterns from historical data 222. The historical data 222 may include behavioral data of aerial vehicles that were previously involved in an incident or previous flight patterns that resulted in an incident.

The behavioral data 210 is also utilized to generate an operator profile 226 of the operator 106. The operator profile 226 indicates how well the operator 106 is operating the aerial vehicle 102. In some implementations, the operator profile 226 includes a score regarding how experienced or risky the operator 106 is being in operating the aerial vehicle 102.

The operator profile 226 is based on the actions the operator 106 took to correct, change, or maneuver the operating parameters (e.g., flight path or orientation) of the aerial vehicle 102, as well as how fluid are those actions. The actions the operator 106 takes include what controls the operator 106 activated on the remote control 104, reaction time (e.g., how long it took the operator 106 to take the action), did the operator 106 over-correct the aerial vehicle 102, or other behaviors that the operator 106 takes to operate the aerial vehicle 102. For example, if the aerial vehicle 102 instantly pitches upward due to a wind gust, how long does it take for the operator 106 to correct the pitch, what controls on the remote control 104 does the operator 106 activate to correct the pitch, and how fluid were those controls. This information is compared to one or more thresholds, ranges, or proficiently levels, and then combined to create the operator profile 226.

The risk generator computing device 114 utilizes the operational history 224 to generate a risk profile 212. The risk profile 212 provides an indication of whether the current flight pattern is the same or within some threshold as a previous flight pattern that resulted in an incident. In some implementations, the risk profile 212 includes a score of the likelihood the aerial vehicle 102 will also be in an incident based on a comparison of its current flight pattern to one or more previous flight patterns. The risk generator computing device 114 computes this risk profile 212 score by comparing the current flight pattern of the aerial vehicle 102 to the previous flight patterns in the operational history 224 to obtain the deviation between the current flight pattern and the previous flight patterns. A higher likelihood of an incident occurring (e.g., a higher risk profile score) may be based on the current flight pattern being more similar to a previous flight pattern that ended in an incident (e.g., lower deviation between current flight pattern and one or more previous flight patterns that resulted in an incident), whereas a lower likelihood of an incident occurring (e.g., a lower risk profile score) may be based on the current flight pattern being more different that the previous flight patterns (e.g., higher deviation between current flight pattern and previous flight patterns that resulted in an incident). The higher the risk profile, the more unsafe the aerial vehicle is operating, and the lower the risk profile, the safer the aerial vehicle is operating.

The risk generator computing device 114 adjusts the risk profile 212 based on the operator profile 226. Since the operator profile 226 provides an indication of how the operator 106 is operating the aerial vehicle 102, it can be used to increase or decrease the risk profile 212. For example, if the aerial vehicle 102 is performing a maneuver that has a high likelihood of an incident (e.g., because numerous other aerial vehicles have been in incidents performing the same maneuver), then the risk profile may be determined to be very high. But the risk profile may be lowered if the operator profile indicates that the operator is experienced and accurately and efficiently operating the aerial vehicle as it performs the maneuver, or the risk profile may be increased if the operator profile indicates an inexperienced or risky operator profile.

In some implementations, the risk profile 212 is further generated or modified based on other information, such as vehicle information 216, risk information 220, or operator information 218. For example, the vehicle information 216 may include a make, model, year, total number of operating hours, history of defects or malfunctions, manufacture recalls, history of incidents, or other information associated with the aerial vehicle 102. The operator information 218 may include a total number of hours that the operator 106 has operated the aerial vehicle 102, previous aerial vehicle incidents, total number of hours that the operator 106 has operated other aerial vehicles, previously demonstrated ability to operate the aerial vehicle 102, certifications, registrations, or other information associated with the operator 106. The risk information 220 may include one or more thresholds, ranges, proficiency levels, or other risk criteria that are used to compare against the operational history 224, operator profile 226, vehicle information 216, and operator information 218 to generate and adjust the risk profile 212.

The risk generator computing device 114 utilizes the risk profile to automatically generate and update rates and coverage 214 for an insurance policy for the aerial vehicle 102 and the operator 106 in real time as the operator 106 is operating the aerial vehicle 102. So as the operator 106 is operating the aerial vehicle 102, the vehicle monitoring system 122 and the remote monitoring system 124 collect aerial-vehicle operational data 206 and remote-control operational data 208, respectively, and provide it to the risk generator 114. The risk generator 114 collects this real-time behavioral data 210 and generates the operational history 224 and the operator profile 226, which is used to dynamically adjust the risk profile 212 so that the rates and coverage 214 reflect real-time liability during operation of the aerial vehicle 102.

Figure 3:
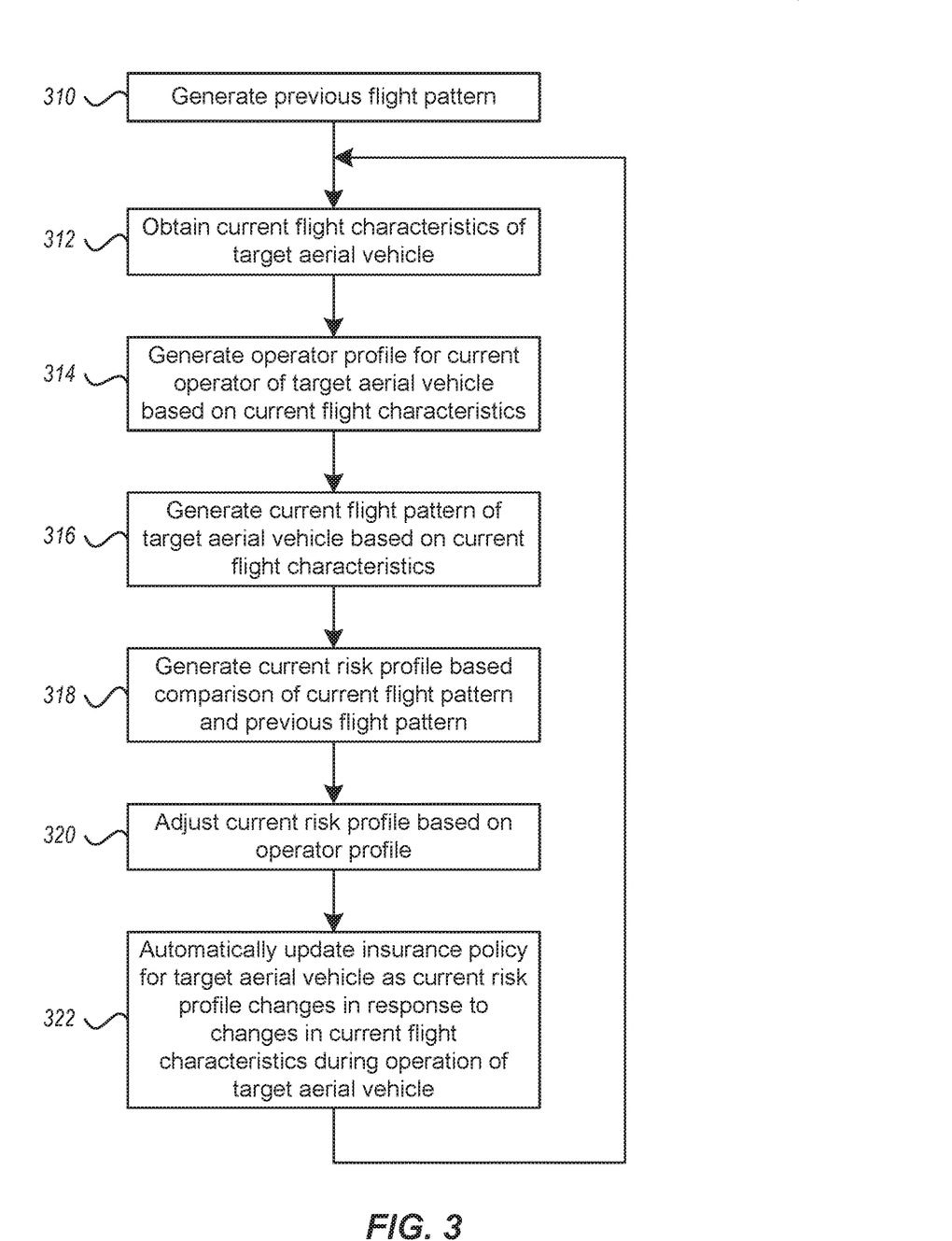
FIG. 3 is a logical flow diagram that illustrates one implementation of a process for providing real-time insurance policy updates for an aerial vehicle and operator in response to current flight characteristics of the aerial vehicle.

FIG. 3 is a logical flow diagram that illustrates one implementation of a process 300 for providing real-time insurance policy updates for an aerial vehicle and operator in response to current flight characteristics of the aerial vehicle. The process 300 begins at block 310, where one or more previous flight patterns are generated for one or more aerial vehicles that were involved in an incident. Each previous flight pattern is generated in response to previous flight characteristics of a respective aerial vehicle prior to the respective incident. A previous flight pattern may be a combination of a plurality of flight characteristics at a given point in time at or prior to an incident, or a plurality of flight characteristics over a period of time prior to the incident.

The process 300 proceeds to block 312, where current flight characteristics of a target aerial vehicle are obtained. The target aerial vehicle is the aerial vehicle being operated by a current operator who is purchasing a dynamic insurance policy for the aerial vehicle while it is being operated. The current flight characteristics are obtained via signals received from a plurality of sensors of a monitoring system associated with the target aerial vehicle. Each of the received signals indicates a unique current flight characteristic of the target aerial vehicle. For example, the current flight characteristics may include aerial-vehicle operational data or remote-control operational data, or a combination thereof, from an aerial-vehicle monitoring system or a remote-control monitoring system, respectively.

The process 300 continues at block 314, where an operator profile is generated for the current operator of the target aerial vehicle. The operator profile is generated based on the current flight characteristics of the target aerial vehicle as the target aerial vehicle is being operated by the current operator. As described herein, the operator profile may be a score or other information that indicates how well the current operator is operating the target aerial vehicle.

The process 300 proceeds to block 316, where a current flight pattern is generated for the target aerial vehicle. The current flight pattern is an ever changing combination of one or more of the plurality of obtained current flight characteristics. Similar to the previous flight pattern, the current flight pattern may be a plurality of current flight characteristics at a given point in time, or a plurality of current flight characteristics over a prior time period (generally ending at the present operating time), which is continuously changing as the aerial vehicle is being operated.

The process 300 continues at block 318, where a current risk profile is generated based on a comparison of the current flight pattern and at least one of the one or more previous flight patterns. One or more different threshold values, ranges, performance levels, or other operational indicators may be used to determine how similar the current flight pattern is to at least one previous flight pattern. This comparison of flight patterns, when evaluated against the operational indicators, provides information (e.g., a value or score) indicative of a likelihood that the target aerial vehicle will be in an incident (e.g., an incident similar to the incident associated with the previous flight pattern).

At block 320 the current risk profile is adjusted based on the operator profile. Since the operator profile indicates how well the current operator is operating the aerial vehicle, it is used to increase or decrease the current risk profile. The risk profile is adjusted such that the better the operational profile of the operator the more favorable the insurance available, which may include lower rates, higher limits of coverage, and expanded provisions. For example, a higher operator profile (e.g., indicating that the current operator is experienced and can efficiently and effectively operate the target aerial vehicle) may result in a decrease in the risk profile. In contrast, a lower operator profile (e.g., indicating that the current operator is inexperienced and cannot efficiently and effectively operate the target aerial vehicle) may result in an increase in the risk profile. Again, various thresholds or ranges may be employed to determine an amount to increase or decrease the risk profile, or not adjust the risk profile, based on the operator profile.

Referring next to block 322, an insurance policy for the target aerial vehicle (or the current operator) is automatically updated in response to changes in the current risk profile. As the current operator operates the target aerial vehicle and the current flight characteristics change, the operator profile and the current risk profile may change in response to the changed current flight characteristics, which results in an insurance policy that dynamically changes in real time as the current operator operates the target aerial vehicle.

After block 322, the process loops back to block 310 to continue to obtain current flight characteristics of the target aerial vehicle, which are used to continually change the risk profile and the operator profile to provide dynamic, real-time changes to the insurance policy for the target aerial vehicle.

Figure 4:
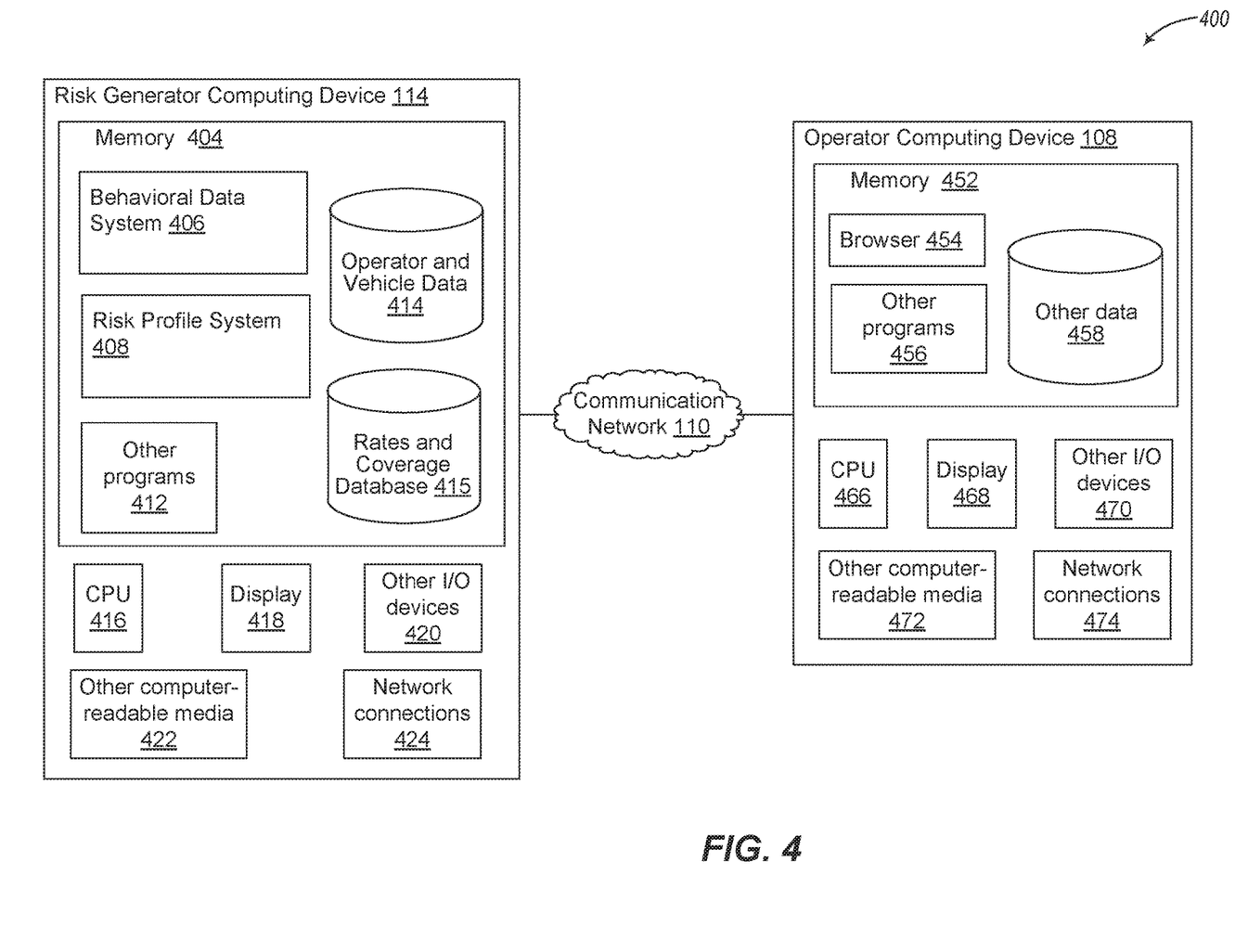
FIG. 4 is a system diagram of computing systems for implementation of the process and method of the present disclosure.

FIG. 4 is a diagram of system 400 of computing systems for implementation of the process and method of the present disclosure. The system 400 includes a risk generator computing device 114 and an operator computing device 108, as described herein.

One or more general-purpose or special-purpose computing systems are used to implement the risk generator computing device 114, to dynamically adjust an insurance policy for an aerial vehicle or operator in real time as the operator is operating the aerial vehicle as described herein. Accordingly, various implementations described herein may be implemented in software, hardware, firmware, or in some combination thereof.

The risk generator computing device 114 includes a memory 404, one or more central processing units (CPUs) 416, a display device 418, other I/O device or interfaces 420, other computer-readable media 422, and network connections 424 (configured to communicate with other computing devices via a wired or wireless communication network, such as communication network 110). The other I/O devices 420 can include a keyboard, audio interfaces, video interfaces, or the like.

The memory 404 utilizes one or more various types of non-volatile or volatile storage technologies. Examples of memory 404 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. The memory 404 may be utilized to store information, including computer-readable instructions that are utilized by the CPU 416 to perform actions, including aspects, implementations, and features described herein.

The memory 404 has stored thereon a behavioral data system 406 or a risk profile system 408. The behavioral data system 406 performs various functions described herein to aggregate operational data received from the monitoring system(s) of an aerial vehicle. The risk profile system 408 performs various functions described herein to generate an operational history of the aerial vehicle and an operator profile for the operator that is operating the aerial vehicle. The risk profile system 408 utilizes the operational history and operator profile to generate and adjust—in real time as the operator is operating the aerial vehicle—a risk profile that is used to generate or update an insurance policy for the operator or aerial vehicle. The memory 404 may also store other programs 412, operator and vehicle data 414 (to store vehicle information, operator information, behavioral data, operator profile data, or behavioral history data), or a rates and coverage database 415 (to store information regarding insurance policy rates and coverages available to operators).

The operator computing device 108 may be implemented by one or more general-purpose or special-purpose computing systems employing software, hardware, firmware, or some combination thereof. Accordingly, these devices and systems include a memory 452, a CPU 466, a display 468, other computer readable media 472, other I/O devices 470, and network connections 474, which may be similar to those same components described above for the risk generator computing device 114. The memory 452 may store instructions for a various computer applications, such as a browser 454 or other programs 456. The memory 452 may also store other data 458. The browser 454 or one of the other programs 456 provides a user interface to enable an operator to view, access, or otherwise obtain insurance information provided by the risk generator computing device 114 or the insurance company providing the dynamic coverage.

The risk generator computing device 114 and the operator computing device 108 may communicate with each other via communication network 110, which may be one or more of a variety of wired or wireless communication networks.

The various implementations described above can be combined to provide further embodiments. Aspects of the implementations can be modified, if necessary, to employ further concepts described herein.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system, comprising:
an aerial-vehicle monitoring system associated with an aerial vehicle, the aerial-vehicle monitoring system including a first plurality of sensors that are capable of capturing performance output data of the aerial vehicle as the aerial vehicle is being operated;
a remote-control monitoring system associated with a remote controller that communicates with the aerial vehicle, the remote-control monitoring system including a second plurality of sensors that are capable of capturing operator input data to the remote controller as a current operator is operating the aerial vehicle;
a computing device comprising:
   a transceiver to receive the performance output data and the operator input data;
   a memory that stores computer instructions and a set of previous flight characteristics of another aerial vehicle prior to the other aerial vehicle being involved in an incident; and
   a processor that executes the computer instructions to perform actions, the actions including:
      generating current flight characteristics of the aerial vehicle in response to the operator input data and the performance output data; and
      generating a comparison of the current flight characteristics to the stored set of previous flight characteristics; and
      automatically updating an insurance policy for the aerial vehicle in real time in response to the comparison.

2. The system of claim 1, wherein the processor executes the computer instructions to perform further actions, the further actions including:
   generating an operator profile for the current operator of the aerial vehicle in response to the current flight characteristics of the aerial vehicle; and
   adjusting the insurance policy in response to the operator profile.

3. The system of claim 1, wherein the processor executes the computer instructions to perform further actions, the further actions including:
   generating a score for the current operator of the aerial vehicle in response to changes in the current flight characteristics of the aerial vehicle; and
   changing at least one of a rate or coverage of the insurance policy in response to changes in the score while the current operator is operating the aerial vehicle.

4. The system of claim 1, wherein the current flight characteristics of the aerial vehicle include at least one of a ground position of the aerial vehicle, an altitude of the aerial vehicle, a speed of the aerial vehicle, an acceleration of the aerial vehicle, a pitch of the aerial vehicle, a roll of the aerial vehicle, a yaw of the target aerial vehicle, a duration of operation of the aerial vehicle, a lifetime inflight duration of the aerial vehicle, known objects relative to the aerial vehicle, and a spatial relationship between the aerial vehicle and the current operator.

5. The system of claim 1, wherein the operator input data includes an operator reaction time to a change in the current flight characteristics, a type of input by the current operator in response to the change in the current flight characteristics, and a rate at which the current operator adjusts operation of the aerial vehicle in response to the change in the current flight characteristics.

6. The system of claim 1, wherein the processor executes the computer instructions to perform further actions, the further actions including:
   prior to operation of the aerial vehicle by a current operator:
      obtaining operator information for the current operator of the aerial vehicle;
      obtaining aerial vehicle information for the aerial vehicle; and
      generating the insurance policy for the aerial vehicle in response to the operator information and the aerial vehicle information.

7. The system of claim 6, wherein the operator information for the current operator of the aerial vehicle includes at least one of a total number of hours that the current operator has operated the aerial vehicle, previous aerial vehicle incidents, total number of hours that the current operator has operated other aerial vehicles, and previously demonstrated ability to operate the aerial vehicle; and wherein the aerial vehicle information for the aerial vehicle includes a type, a make, a model, and a total number of operating hours of the aerial vehicle.

8. The system of claim 1, wherein the processor executes the computer instructions to perform further actions, the further actions including:
   obtaining at least one environmental characteristic while the aerial vehicle is being operated; and
   adjusting at least one of a rate or coverage of the insurance policy in response to the obtained at least one environmental characteristic.

9. A computing device, comprising:
   a memory that stores computer instructions and a set of previous flight characteristics of another aerial vehicle prior to the other aerial vehicle being involved in an incident; and
   a processor that executes the computer instructions to perform actions as a current operator is operating a target aerial vehicle, the actions including:
      receiving operator input data obtained by a first plurality of sensors on a remote control communicating with the target aerial vehicle;
      receiving performance output data obtained by a second plurality of sensors mounted on the target aerial vehicle;
      generating current flight characteristics of the target aerial vehicle in response to the operator input data and the performance output data;
      generating a current risk profile in response to a comparison of the current flight characteristics of the target aerial vehicle with the set of previous flight characteristics of the other aerial vehicle; and
      automatically updating an insurance policy for the target aerial vehicle in real time as the current risk profile changes in response to changes in the current flight characteristics.

10. The computing device of claim 9, wherein the processor executes the computer instructions to perform further actions, the further actions including:
   generating an operator profile for the current operator of the target aerial vehicle based on the current operator's control of the target aerial vehicle in response to changes in the current flight characteristics of the target aerial vehicle; and
   adjusting the current risk profile in response to the operator profile.

11. The computing device of claim 9, wherein the processor executes the computer instructions to perform further actions, the further actions including:
   generating a score for the current operator of the target aerial vehicle in response to the current flight characteristics of the target aerial vehicle;

increasing the current risk profile when the score is below a first predetermined threshold; and decreasing the current risk profile when the score is above a second predetermined threshold.

12. The computing device of claim 9, wherein the current flight characteristics of the target aerial vehicle include at least one of a ground position of the target aerial vehicle, an altitude of the target aerial vehicle, a speed of the target aerial vehicle, an acceleration of the target aerial vehicle, a pitch of the target aerial vehicle, a roll of the target aerial vehicle, a yaw of the target aerial vehicle, a duration of operation of the target aerial vehicle, a lifetime inflight duration of the target aerial vehicle, known objects relative to the target aerial vehicle, and a spatial relationship between the target aerial vehicle and the current operator.

13. The computing device of claim 9, wherein the operator input data includes an operator reaction time to a change in the current flight characteristics, a type of input by the current operator in response to the change in the current flight characteristics, and a rate at which the current operator adjusts operation of the target aerial vehicle in response to the change in the current flight characteristics.

14. The computing device of claim 9, wherein the processor executes the computer instructions to perform further actions, the further actions including:

prior to operation of the target aerial vehicle:
obtaining operator information for the current operator of the target aerial vehicle;
obtaining aerial vehicle information for the target aerial vehicle; and
generating the insurance policy for the target aerial vehicle based on the operator information and the target aerial vehicle information.

15. The computing device of claim 14, wherein the operator information for the current operator of the target aerial vehicle includes at least one from among a total number of hours that the current operator has operated the target aerial vehicle, previous aerial vehicle incidents, total number of hours that the current operator has operated other aerial vehicles, and previously demonstrated ability to operate the target aerial vehicle; and wherein the aerial vehicle information for the target aerial vehicle includes a type, a make, a model, and a total number of operating hours of the target aerial vehicle.

16. A method, comprising:

generating, for each respective aerial vehicle of a plurality of aerial vehicles that were each involved in a respective incident, a set of previous flight characteristics that occurred prior to the respective incident;

sensing, by a first plurality of sensors on a remote control communicating with a target aerial vehicle, operator input provided by a current operator of the target aerial vehicle while the current operator is operating the target aerial vehicle;

sensing, by a second plurality of sensors on the target aerial vehicle, performance output of the target aerial vehicle while the target aerial vehicle is being operated by the current operator;

generating current flight characteristics of the target aerial vehicle in response to the operator input and the performance output; and automatically updating an insurance policy for the target aerial vehicle in real time in response to changes in the current flight characteristics as the current operator operates the target aerial vehicle, wherein the updating is based on a comparison of the current flight characteristics of the target aerial vehicle with each set of previous flight characteristics of the plurality of aerial vehicles.

17. The method of claim 16, further comprising:

generating an operator profile for the current operator of the target aerial vehicle in response to the current flight characteristics of the target aerial vehicle, the operator profile provides an indication of how well the current operator is operating the target aerial vehicle;

increasing a rate or decreasing coverage of the insurance policy in response to a decrease in the operator profile; and decreasing the rate or increasing the coverage of the insurance policy in response to an increase in the operator profile.

18. The method of claim 16, wherein the current flight characteristics of the target aerial vehicle include at least one of a ground position of the target aerial vehicle, an altitude of the target aerial vehicle, a speed of the target aerial vehicle, an acceleration of the target aerial vehicle, a pitch of the target aerial vehicle, a roll of the target aerial vehicle, a yaw of the target aerial vehicle, a duration of operation of the target aerial vehicle, a lifetime inflight duration of the target aerial vehicle, known objects relative to the target aerial vehicle, and a spatial relationship between the target aerial vehicle and the current operator.

19. The method of claim 16, wherein the operator input data includes an operator reaction time to a change in the current flight characteristics, a type of input by the current operator in response to the change in the current flight characteristics, and a rate at which the current operator adjusts operation of the target aerial vehicle in response to the change in the current flight characteristics.

20. The method of claim 16, further comprising:

wherein generating the set of previous flight characteristics that occurred prior to the respective incidents of the plurality of aerial vehicles includes determining at least one previous environmental characteristic associated with each respective incident;

obtaining at least one current environmental characteristic while the target aerial vehicle is being operated; and adjusting the insurance policy based on a comparison of the at least one current environmental characteristic with each of the at least one previous environmental characteristics associated with the respective incidents of the plurality of aerial vehicles.

* * * * *